United States Patent
Ishii

(10) Patent No.: US 9,051,001 B2
(45) Date of Patent: Jun. 9, 2015

(54) POWER STEERING APPARATUS AND SPEED REDUCER FOR POWER STEERING

(71) Applicant: HITACHI AUTOMOTIVE SYSTEMS STEERING, LTD., Hiki-gun, Saitama (JP)

(72) Inventor: Shozo Ishii, Kanagawa (JP)

(73) Assignee: HITACHI AUTOMOTIVE SYSTEMS STEERING, LTD., Hiki-gun (JP)

( * ) Notice: Subject to any disclaimer, the term of this patent is extended or adjusted under 35 U.S.C. 154(b) by 36 days.

(21) Appl. No.: 13/859,389

(22) Filed: Apr. 9, 2013

(65) Prior Publication Data

US 2014/0083794 A1   Mar. 27, 2014

(30) Foreign Application Priority Data

Sep. 24, 2012  (JP) ................. 2012-209127

(51) Int. Cl.
  *B62D 5/04*  (2006.01)
  *F16H 1/16*  (2006.01)

(52) U.S. Cl.
  CPC ............... *B62D 5/0409* (2013.01); *F16H 1/16* (2013.01); *Y10T 74/19828* (2015.01)

(58) Field of Classification Search
  CPC .... B62D 5/0409; F16H 1/16; Y10T 74/19828
  USPC ..................... 180/443, 444; 74/425
  See application file for complete search history.

(56) References Cited

U.S. PATENT DOCUMENTS

| | | | |
|---|---|---|---|
| 2009/0255751 A1* | 10/2009 | Kondo et al. | 180/444 |
| 2010/0243367 A1* | 9/2010 | Suzuki et al. | 180/444 |
| 2010/0260448 A1 | 10/2010 | Hafermalz et al. | |

* cited by examiner

*Primary Examiner* — Joseph Rocca
*Assistant Examiner* — Jacob Knutson
(74) *Attorney, Agent, or Firm* — Foley & Lardner LLP

(57) ABSTRACT

An apparatus for power steering of a vehicle, comprises: a worm gear arrangement including a worm shaft and a worm wheel engaged with the worm shaft; a bearing to support the worm shaft rotatably; a gear housing structure enclosing the worm gear arrangement, and defining a holder receiving portion; and a holder member arranged to hold the bearing, and fit movably radially in the holder receiving portion. A biasing mechanism urges the holder member or the bearing in a nearing direction toward the worm wheel. A buffer member is arranged to be compressed by the holder member when the holder member is moved in the nearing direction to buffer collision of the holder member in the holder receiving portion. The buffer member is set to have an elastic force smaller than the biasing elastic force of the biasing mechanism.

7 Claims, 7 Drawing Sheets

POWER STEERING APPARATUS AND SPEED REDUCER FOR POWER STEERING

BACKGROUND OF THE INVENTION

The present invention relates to apparatus for power steering.

A power steering apparatus of a known type includes a speed reducer including a worm shaft to which a rotational force is transmitted from an electric motor, and a worm wheel engaged with the worm shaft. US 2010/0260448 A1 (Hafermalz et al.) shows a speed reducer including a holder member which holds a bearing for supporting the worm shaft and which is movable in a radial direction together with the bearing, a biasing mechanism for urging the bearing in a direction to decrease an axis-to-axis distance between the rotation axis of the worm shaft and the rotation axis of the worm wheel, and a buffer member for cushioning collision of the holder member in a holder receiving portion.

SUMMARY OF THE INVENTION

However, the buffer member might exert influence on the urging force of the biasing mechanism. Therefore, it is an object of the present invention to provide a power steering apparatus and a speed reducer for power steering apparatus which are designed to reduce influence on the urging force of the biasing mechanism, by the buffer member.

According to the present invention, the buffer member is set to have an elastic force smaller than an elastic force of the biasing mechanism.

DETAILED DESCRIPTION OF THE INVENTION

FIGS. 1~12 show a power steering apparatus and a speed reducer according to one embodiment according to the present invention.

The power steering apparatus according to the embodiment is adapted to be mounted on a motor vehicle, and arranged to assist a driver's steering operation by imparting a steering assist force to a steering mechanism. The steering mechanism or steering linkage includes a steering shaft 2 connected with a steering wheel to be operated by a driver. The steering mechanism is arranged to transmit a steering operation inputted to the steering wheel, to steerable wheel(s) of the vehicle. The steering mechanism of this example includes a rack and pinion mechanism as a gear mechanism for transmitting a rotational force of steering shaft 2. The power steering apparatus includes an electric motor to provide a steering force (a steering assist force) to the steering mechanism, and a speed reducer or speed reducing (gear) mechanism 1 provided between the electric motor and the steering mechanism, and arranged to convert, increase and, transmit a rotational force from the motor to the steering mechanism. The electric motor is controlled by an electronic control unit in accordance with a driver's steering operation or steering condition and a vehicle condition. For example, the electric motor is controlled to increase a greater motor torque as a driver's steering torque becomes greater and/or as the vehicle speed lowers.

Figure 1:
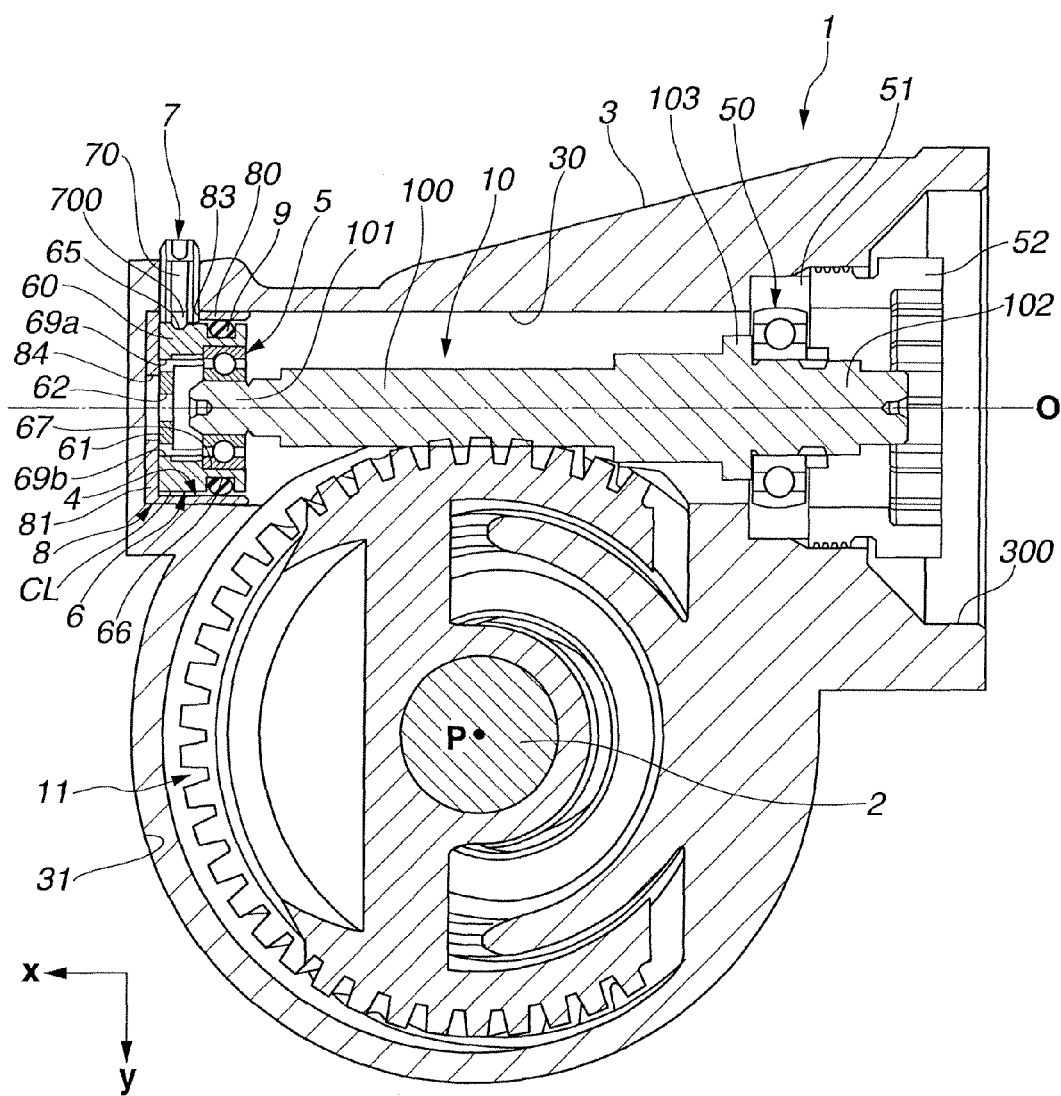
FIG. 1 is a sectional view showing a speed reducer 1 in a power steering apparatus according to one embodiment of the present invention.

FIG. 1 shows a part of the power steering apparatus. As shown in FIG. 1, the speed reducer 1 of the power steering apparatus includes a worm gear arrangement or set including a worm shaft 10 adapted to receive, at one shaft end, a rotational force of the electric motor, and a worm wheel 11 mounted on the steering shaft 2 and engaged with the worm shaft 10. In this example, the worm wheel 11 is made of resin. A following rectangular coordinate system is used hereinafter to facilitate understanding. An x axis is an axis extending in an axial direction of worm shaft 10. A y axis is perpendicular to the x axis (and parallel to the sheet of FIG. 1. A z axis is perpendicular to the x axis and to the y axis (and perpendicular to the sheet of FIG. 1). The worm shaft 10 extends from a first shaft end (102) adapted to be connected with the electric motor, to a second shaft end (101) supported by a bearing 5. The first shaft end (102) is located on an x negative side (or x axis negative side), and the second shaft end (101) is located on an x positive side (or x axis positive side). As viewed in FIG. 1, a rightward direction is an x (axis) negative direction, and a leftward direction is an x (axis) positive direction. As viewed in FIG. 1, a y (axis) positive direction is a downward direction which is a nearing direction to decrease an axis-to-axis distance between a rotation axis (O) of the worm shaft 10 and a rotation axis (P) of the worm wheel 11. A y (axis) negative direction is an upward direction, as viewed in FIG. 1, which is a receding direction to increase the axis-to-axis distance between worm shaft 10 and worm wheel 11. The x axis is perpendicular to the sheet of FIG. 1, a z (axis) positive direction is a direction in which the sheet of FIG. 1 faces, and a z (axis) negative direction is a direction in which the other side or overleaf of the sheet of FIG. 1 faces. The rotation axis (P) of worm wheel 11 extends along the x axis.

A gear housing 3 shown in FIG. 1 includes a shaft receiving portion 30 encasing the worm shaft 10 and a wheel receiving portion 31 encasing the worm wheel 11. The shaft receiving portion 30 is a cylindrical portion extending along the x axis from a first end opened to the outside of gear housing 3 on the x negative side to a second end closed on the x positive side. Worm shaft 10 extends axially from a first shaft end (portion) 102 on the x negative side to a second shaft end (portion) 101 on the x positive side. The first shaft end (portion) 102 of worm shaft 10 is adapted to be connected with the electric motor (not shown) so that torque is transmitted to worm shaft 10 from the motor.

Bearings 5 and 50 support the worm shaft 10 rotatably in the shaft receiving portion 30. The bearing 50 supports the first shaft end portion 102 of worm shaft 10 on the x negative side. Bearing 50 of this example is a roller bearing (or a rolling element bearing) including an inner race and an outer race. The inner race is fit over the first shaft end portion 102. An outward flange 103 formed in worm shaft 10 is arranged to limit axial movement of the inner race in the x positive direction, toward the second shaft end portion 101. The outer race has a projected curved outside circumferential surface curved along the x axis. An annular member 51 is disposed in a stepped portion formed in the shaft receiving portion 30 on the x negative side. Annular member 51 has a recessed curved inside circumferential surface curved along the x axis. The projected curved outside circumferential surface of the outer race is fit in the recess curved inside circumferential surface of annular member 51 surrounding the bearing 50. The outer race of bearing 50 can slide on the inside recessed curved circumferential surface of annular member 51, and accordingly the bearing 50 can rotate slightly about its center. Annular member 51 is clamped and fixed axially, in the x direction, between the stepped portion of shaft receiving portion 30 and an annular stopper member 52 which is fixed to the inside of shaft receiving portion 30 by screws. Thus, the bearing 50 (together with the worm shaft 10) can incline with respect to the x axis within a predetermined angular range while the axial movement of bearing 50 (and worm shaft 10) is limited in the x axis direction.

The bearing 5 is arranged to support the second shaft end portion 101 of worm shaft 10 on the x positive side. In this example, the bearing 5 is a roller bearing (or rolling element bearing) including inner and outer races. Bearing 5 is fit over the second shaft end portion 101 and arranged so that bearing 5 can move mainly in the y axis direction together with the second shaft end portion 101 within a predetermined range. Therefore, worm shaft 10 is rotatable slightly at least about the bearing 50 (about the center of bearing 50) in an xy plane. Thus, this worm shaft supporting structure makes it possible to vary a clearance or backlash between the teeth of worm wheel 11 and the teeth of a worm 100 which is formed between bearings 5 and 50 and which is engaged with the worm wheel 11.

The speed reducer 1 includes a backlash adjusting mechanism for adjusting the above-mentioned backlash between the teeth of worm 100 and the teeth of worm wheel 11. The backlash adjusting mechanism is formed by a holder receiving portion 4, a bearing 5, a holder member 6, a biasing (or urging) mechanism 7, an outer holder 8 and a buffer (or cushioning) member 9. Holder member 6 is a cylindrical member having a bottom. Bearing 5 is received and held in holder member 6. The holder receiving portion 4 is formed in an end portion of the shaft receiving portion 30 on the x positive side and arranged to receive the holder member 6. Holder receiving portion 4 is formed in the outer holder 8 (inside the inside circumferential surface of outer holder 8). Outer holder 8 is a cylindrical member having a bottom. Outer holder 8 is disposed in the x positive side end portion of the shaft receiving portion 30, and arranged to hold the holder member 6 in the inside of outer holder 8. In the holder receiving portion 4, the holder member 6 is movable with bearing 5, in a direction (y direction) such that (the rotation axis O of) the worm shaft 10 can move toward and away from (the rotation axis P of) the worm wheel 11.

The biasing (or urging) mechanism 7 is provided in the gear housing 3, and arranged to urge the holder member 6 to the y positive side and thereby to urge the worm shaft 10 (worm 100) toward the worm wheel 11 to move the rotation axis O of worm shaft 10 toward the rotation axis P of worm wheel 11. Biasing mechanism 7 of this example includes a plunger 70 and a coil spring. Plunger 70 is inserted through the gear housing 3 so that the axis of plunger 70 extends along the y axis, and arranged so that plunger 70 is movable along the y axis. Plunger 70 extends in the y positive direction from a base end portion on the y negative side to a forward end portion (abutment portion) 700 on the y positive side. The forward end portion 700 project into the shaft receiving portion 30 and has a hemispherical end adapted to abut against the outside circumference of holder member 6. The base end portion of plunger 70 on the y negative side projects out of the gear housing 3, and is provided with a coil spring (not shown in FIG. 1). The coil spring is a biasing member of this example, for producing an elastic force and thereby urging the plunger 70 toward holder member 6 (in the y positive direction). The coil spring is an elastic member made of an elastic material. The coil spring is installed in a compressed state compressed shorter than a state of a natural length, thereby to develop the elastic force. It is optional to use, as the urging member, various other forms of the elastic member instead of the coil spring.

Figure 2:
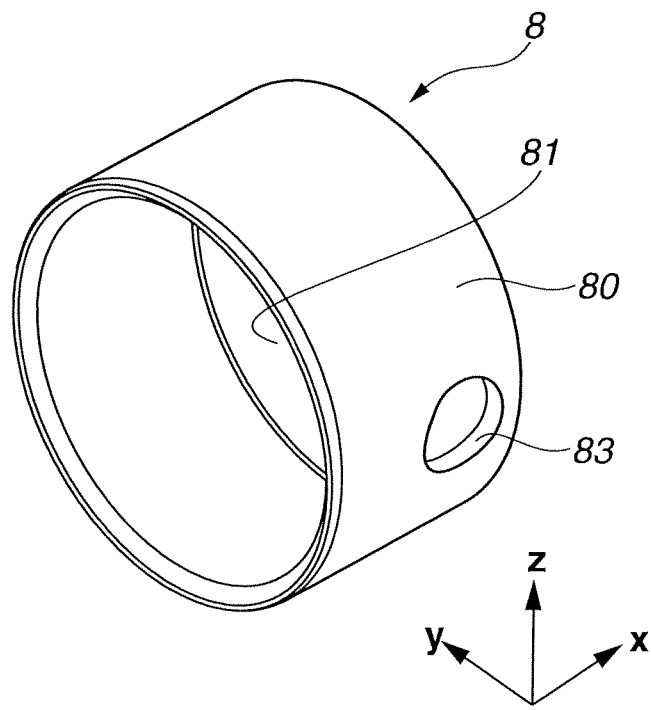
FIG. 2 is a perspective view of an outer holder 8 shown in FIG. 1.
Figure 3:
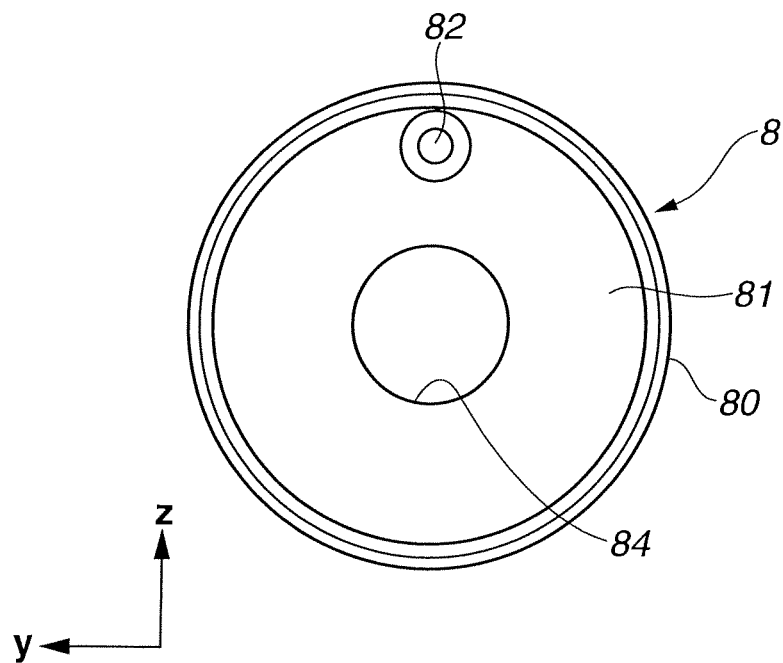
FIG. 3 is a front view of the outer holder 8 (as viewed from an x negative side).
Figure 4:
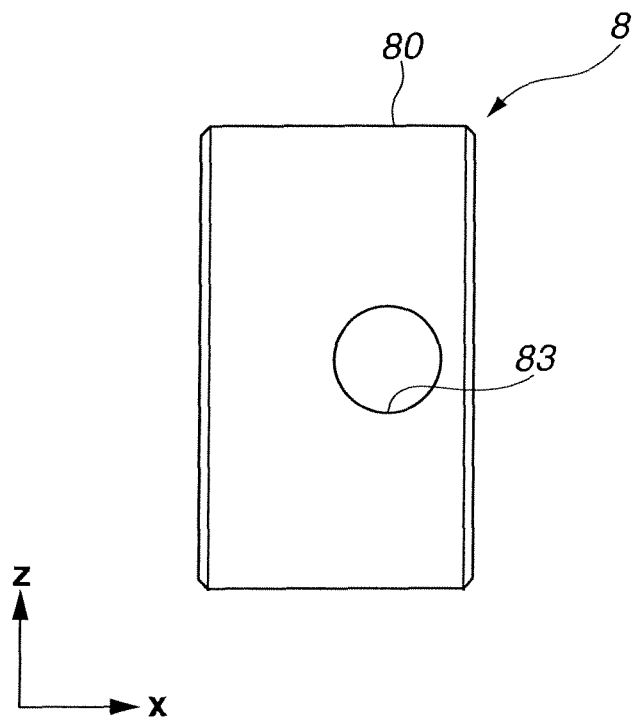
FIG. 4 is a side view of the outer holder 8.
Figure 5:
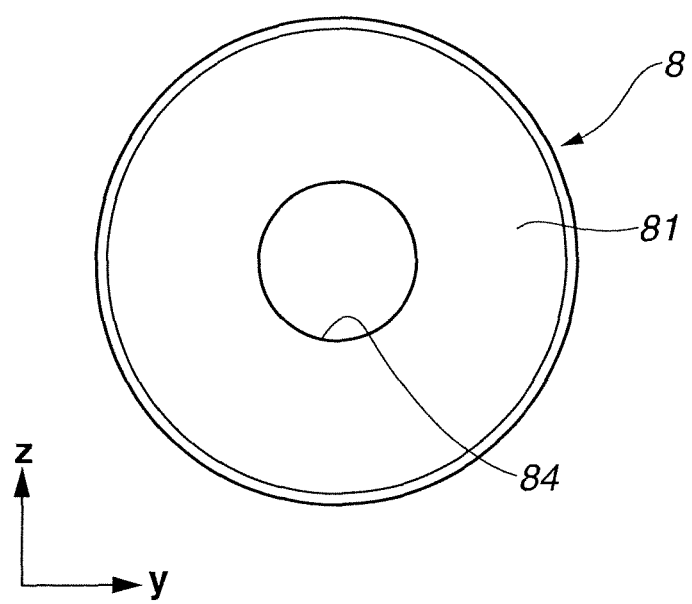
FIG. 5 is a front view of the outer holder 8 (as viewed from an x positive side).

Outer holder 8 is shown in FIGS. 2~5. FIG. 2 shows outer holder 8 in perspective as viewed from the x negative side, y negative side and z positive side. FIG. 3 shows outer holder 8 in front view as viewed from the x negative side. FIG. 4 shows outer holder 8 in side view as viewed from the y negative side. FIG. 5 shows outer holder 8 in front view as viewed from the x positive side.

Outer holder 8 includes a cylindrical (wall) portion 80 and a bottom (end wall) portion 81. The cylindrical portion 80 extends (axially) in the x direction from a first end on the x positive side to a second end on the x negative side. The bottom portion 81 is formed so as to close the first end of cylindrical portion 80 on the x positive side. Bottom portion 81 is circular and formed with a (center) through hole 84 which is a circular center hole formed around the axis of cylindrical portion 80 (around the center of circular bottom portion 81) as a center. The (center) through hole 84 is designed to be used as breathing hole for facilitating the assembly operation at the time of operation of assembling the outer holder 8 and other parts.

A fulcrum (or supporting portion) 82 is formed in bottom portion 81, inside the cylindrical portion 80. Fulcrum 82 is a projection projecting in the x negative direction from the inside surface of bottom portion 81 facing in the x negative direction. Fulcrum 82 is formed near, or adjacent to, the inside circumferential surface of cylindrical portion 80, on the z positive side. Fulcrum 82 is located on an imaginary straight line extending from the axis of cylindrical portion 80 (from the center of bottom portion 81) in the z direction.

A (side) through hole 83 is formed in the cylindrical portion 80, on the y negative side. The (side) through hole 83 is a circular through hole located at an (axial) position closer to the first end of cylindrical portion 80 on the x positive side.

Figure 6:
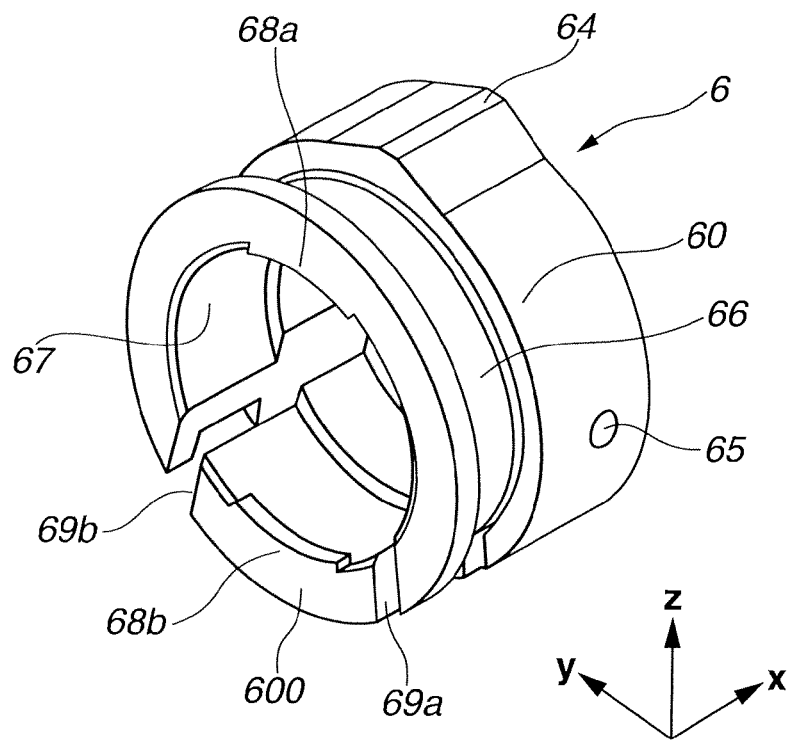
FIG. 6 is a perspective view of a holder member 6 shown in FIG. 1.
Figure 7:
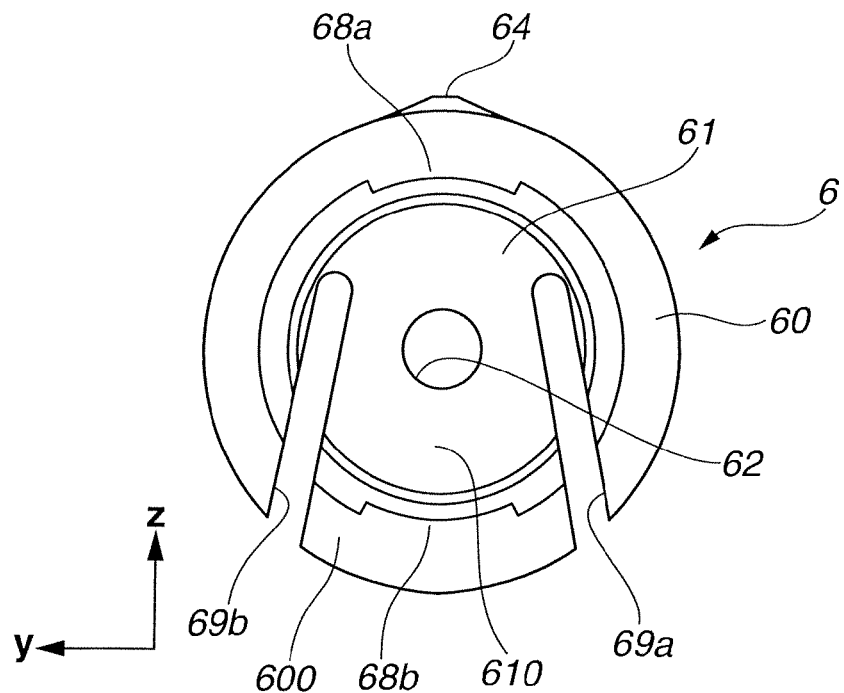
FIG. 7 is a front view of the holder member 6 (as viewed from the x negative side).
Figure 8:
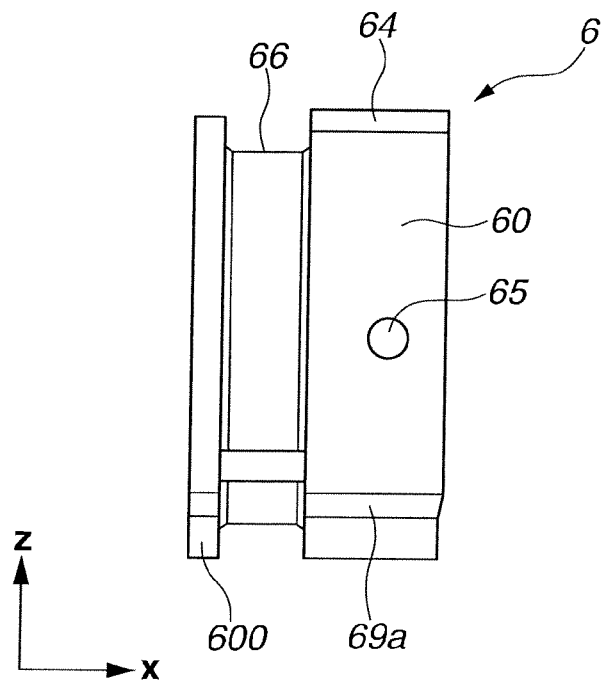
FIG. 8 is a side view of the holder member 6.
Figure 9:
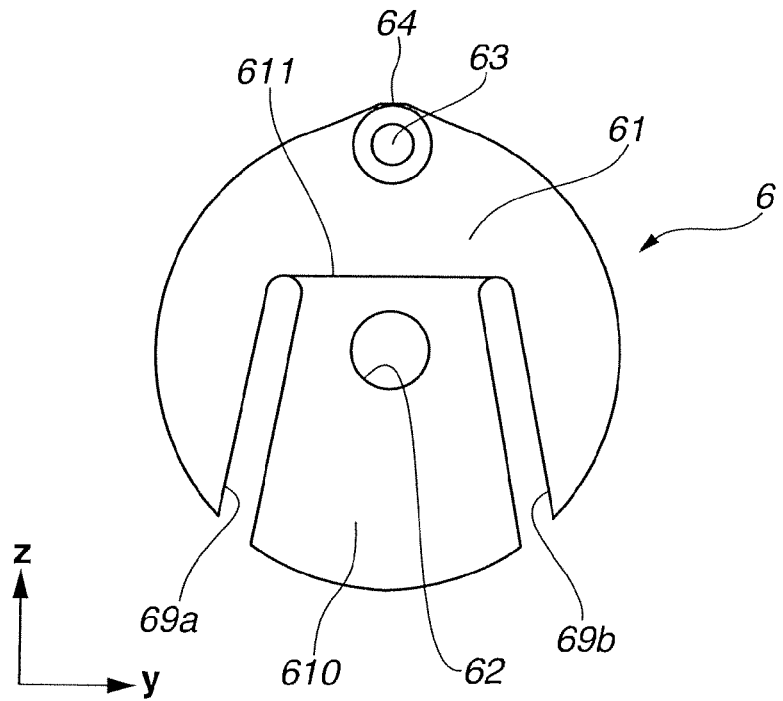
FIG. 9 is a front view of the holder member 6 (as viewed from the x positive side).

The holder member 6 is shown in FIGS. 6~9. FIG. 6 shows holder member 6 in perspective as viewed from the x negative side, y negative side and z positive side. FIG. 7 shows holder member 6 in front view as viewed from the x negative side. FIG. 8 shows holder member 6 in side view as viewed from the y negative side. FIG. 9 shows holder member 6 in front view as viewed from the x positive side.

The holder member 6 is made of resin material, and includes a cylindrical wall portion 60 extending (axially) in the x direction from a first end on the x positive side to a second end on the x negative side, and a bottom (end wall) portion 61 formed at the first end of wall portion 60 on the x positive side so as to close the first end of wall portion 60. Bottom portion 61 is circular and formed with a (center) through hole 62 which is a circular center hole formed around the axis of cylindrical wall portion 60 (around the center of circular bottom portion 61) as a center. The (center) through hole 62 is designed to be used as breathing hole for facilitating the assembly operation at the time of operation of assembling the holder member 6 and other parts (especially when an O ring is used as the buffer member 9, as explained later).

A fulcrum engaging or receiving portion 63 is formed in bottom portion 61, inside the cylindrical portion 80. Fulcrum engaging portion 63 is a depression depressed in the x negative direction from the outside surface of bottom portion 61 facing in the x positive direction. Fulcrum engaging portion 63 is formed in the bottom portion 61, near, or adjacent to, the outside circumferential surface of cylindrical wall portion 60, on the z positive side. Fulcrum engaging portion 63 is located on an imaginary straight line extending from the axis of cylindrical wall portion 60 (from the center of bottom portion 61) in the z direction.

A seat portion or abutment portion 65 is formed in the outside circumferential surface of cylindrical wall portion 60 at a position on the y negative side, closer to the first end of wall portion 60 on the x positive side. The seat portion 65 is a depression depressed in the y negative direction from the outside circumferential surface of cylindrical wall portion 60.

An annular groove 66 is formed in the outside circumferential surface of wall portion 60, at a position closer to the second end of wall portion 60 on the x negative side (on a side opposite to the fulcrum engaging portion 63 in the axial direction of holder member 6). The annular groove 66 extends circumferentially around the axis of wall portion 60 through 360 degrees.

A protruding portion 64 is formed in the outside circumferential surface of wall portion 60 at a position on the x positive side of annular groove 66. That is, the protruding portion 64 is formed axially between the annular groove 66 and the first end of wall portion 60 on the x positive side. The top of protruding portion 64 is located on an imaginary plane passing through the axis of cylindrical wall portion 60 and extending in the z direction. Protruding portion 64 is a projection extending (axially) in the x direction. As viewed from the x direction, the protruding portion 64 is located near the fulcrum engaging portion 63.

A bearing receiving portion 67 is formed by the inside circumferential surface of cylindrical wall portion 60 on the x negative side, at a position (axial position) in the x direction corresponding to the (axial) position of annular groove 66. Bearing receiving portion 67 is an annular recess extending circumferentially around the axis of wall portion 60 through 360 degrees and extending axially from an outer end adjacent to the second end of wall portion 60 on the x negative side. The annular bearing receiving portion 67 is surrounded by the annular groove 66 in such a manner as to form two concentric circles in a cross section of the cylindrical wall portion 60 over a predetermined length in the x direction.

A retaining portion 68 for preventing (axial) extraction of the bearing 5 is formed in the inside circumference of the second end of cylindrical wall portion 60 on the x negative side. The retaining portion 68 of the illustrated example includes a first retaining portion 68a on the z positive side and a second retaining portion 68b on the z negative side. Each of first and second retaining portions 68a and 68b is a plate-shaped projection slightly projecting radially inwards from the inside circumferential surface of wall portion 60, in the form of a thin plate having a small dimension (or thickness) in the x direction. In the illustrated example, the retaining portions 68a and 68b include end surfaces which are flush with the annular end surface of cylindrical wall portion 60 facing in the x negative direction.

A cutout or slot or slit 69 is formed in holder member 6. In this example, the holder member 6 is formed with a first cutout 69a and a second cutout 69b. Cutouts 69a and 69b extend, in the x direction, in both of cylindrical wall portion 60 and bottom portion 61, over the full axial length of holder member 6 in the x direction. As viewed from the x direction (as shown in FIG. 7 and FIG. 9), the cutouts 69a and 69b extend rectilinearly approximately in the z direction on both sides (the y positive side and the y negative side) of the axis of cylindrical wall portion 60 (the center through hole 62), and open on the z negative side of holder member 6. The first and second cutouts 69a and 69b are arranged in a tapered form so that the distance between first and second cutouts 69a and 69b in the y direction is decreased gradually in the z direction from the z negative side to the z positive side.

The cutouts 69a and 69b are formed in a region on the side opposite to the fulcrum engaging portion 63, and extended over a distance equal to or greater than a half of the dimension (or diameter) of holder member 6 in the z direction (as shown in FIG. 9). The first retaining portion 68a on the z negative side is located between the first cutout 69a on the y negative side and the second cutout 69b on the y positive side (as shown in FIG. 7).

An L-shaped portion (600, 610) is formed, in holder member 6, between the first and second cutouts (slots) 69a and 69b. The L-shaped portion includes an axially extending portion or tongue-shaped portion 600 formed in the cylindrical wall portion 60 between first and second cutouts 69a and 69b, and a radially extending portion 610 formed in the bottom portion 61 between first and second cutouts 69a and 69b. The axially extending portion 600 extends axially in the x direction from the radially extending portion 610 of bottom portion 61 to the forward end on the x negative side (like a cantilever). The retaining portion 68b on the z negative side is formed at the forward end of the axially extending portion 600, as shown in FIG. 6 and FIG. 7. The center through hole 62 is formed in the radially extending portion 610, between first and second cutouts 69a and 69b, as shown in FIG. 7 and FIG. 9. The radially extending portion 610 is thinner and smaller in the dimension in the x direction (wall thickness) than a remaining portion of the bottom portion 61. The remaining portion of bottom portion 61 is a C-shaped portion extending around the radially extending portion 610, as shown in FIG. 9 and including a middle portion including the fulcrum engaging potion 63, a first segment (bow-shaped portion) extending from the middle portion along the first cutout 69a which separates the first segment from the radially extending portion 610, and a second segment (bow-shaped portion) extending from the middle portion along the second cutout 69b which separates the second segment from the radially extending portion 610. In the bottom portion 61, a boundary line 611 between the radially extending portion 610 and (the middle portion of) the C-shaped remaining portion extends straight substantially in the y direction, on the z positive side of center through hole 62, from the z positive side end of first cutout 69a to the z positive side end of second cutout 69b.

In the illustrated example, the holder member 6 is basically symmetrical in a manner of bilateral symmetry (except for some part such as the seat portion 65), as shown in FIGS. 7 and 9. The first and second cutouts 69a and 69b are arranged symmetrically with respect to an imaginary median plane containing the axis (extending along the x axis) of holder member 6 and extending along the z axis. The median plane bisects each of the retaining portions 68a and 68b, the center through hole 62, the protruding portion 64, and the portions 600 and 610, into left and right substantially equal halves. Similarly, the outer holder 8 of the illustrated example is basically symmetrical in the manner of bilateral symmetry as shown in FIG. 3 and FIG. 5 (except for the side through hole 83), with respect to an imaginary median plane bisecting each of the center hole 84 and the fulcrum 82.

Figure 10:
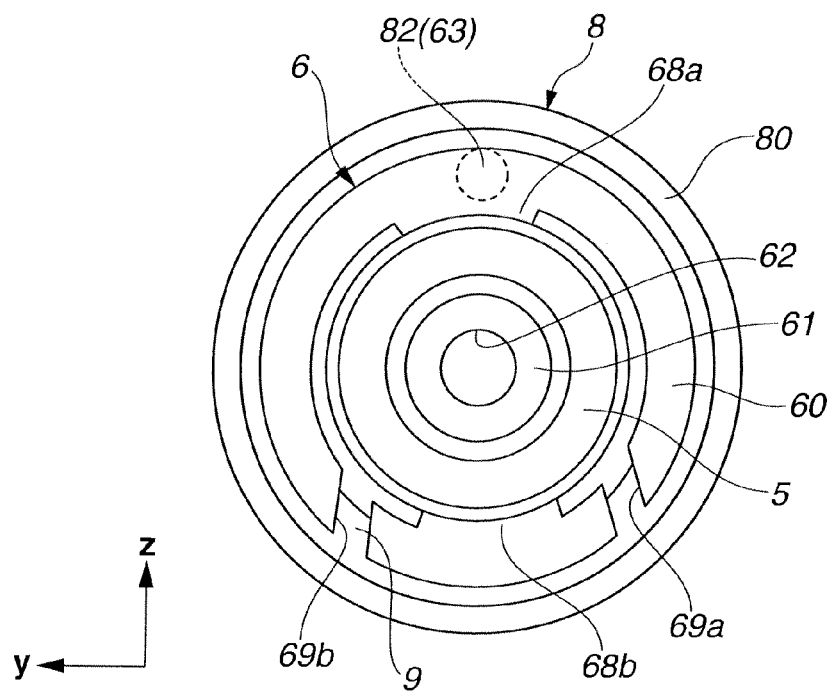
FIG. 10 is a front view of a unit of a backlash adjusting mechanism according to the embodiment.
Figure 11:
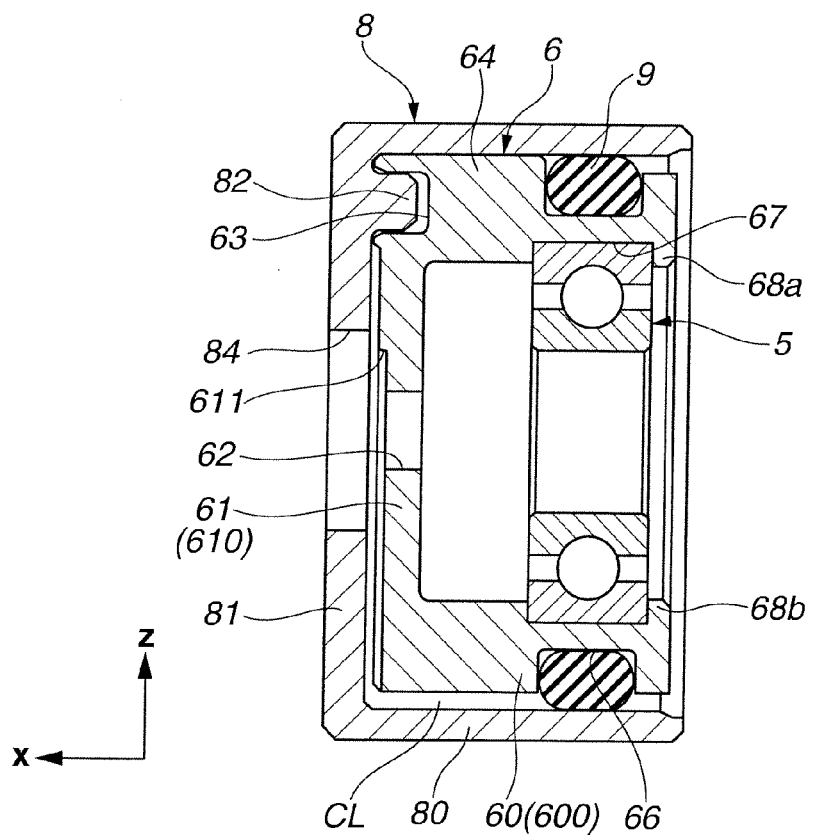
FIG. 11 is an axial sectional view of the unit of the backlash adjusting mechanism.

FIGS. 10 and 11 show a unit (assembly) of the bearing 5, holder member 6, outer holder 8 and buffer member 9 constituting the backlash adjusting mechanism. FIG. 10 shows the unit in a front elevation as viewed from the x negative side. Bearing 5 is shown in a simplified form (omitting rolling elements or balls, etc.) FIG. 11 shows the unit in a section as if cut by a plane which passes through, or contains, the axis of outer holder 8 and which is parallel to a XZ plane containing the x axis and the z axis.

The holder member 6 is nested and received in outer holder 9. Holder member 6 is inserted, from the bottom portion 61, into outer holder 8. The bottom portion 61 of holder member 6 confronts the bottom portion 81 of outer holder 8 across a narrow clearance, inside outer holder 8. There is provided a predetermined (radial) clearance CL between the inside circumferential surface of cylindrical wall portion 80 of outer cylinder 8 and the outside circumferential surface of cylindrical wall portion 60 of holder member 6. In a neutral state shown in FIG. 10 (in which the axis of holder member 6 is approximately coincident with the axis of outer holder 8), the (radial) distance of the clearance CL is substantially constant in the circumferential direction as viewed from the x (axial) direction. The fulcrum engaging portion 63 of holder member 6 is formed in the outside surface of bottom portion 61 facing in the x positive direction. The fulcrum engaging portion 63 is located at a position approximately coincident with the position of fulcrum 82 as viewed from the x direction, and engaged with fulcrum 82. In the illustrated example, the fulcrum engaging portion 63 is in the form of a recess and the fulcrum 82 is in the form of a projection. However, it is possible to employ an arrangement in which the fulcrum engaging portion 63 is a projection and the fulcrum 82 is a recess adapted to engage with the projection of fulcrum engagement portion 63. In this state, the forward end of protruding portion 64 of holder member 6 confronts the inside circumferential surface of cylindrical wall portion 80 of outer holder 8 across a small clearance. The holder member 6 is swingable in the outer holder 8 (holder receiving portion 4) about the fulcrum 82 (engaged with the fulcrum engaging portion 63) within the range of the clearance CL. The protruding portion 64 of holder member 6 functions as a guide in the swing motion and thereby smooth the swing motion.

Bearing 5 is received in the bearing receiving portion 67 of holder member 6. The end portion 101 of worm shaft 10 on the x positive side is received in bearing 5. The retaining portions 68a and 68b of holder member 6 on the z positive side and z negative side abut axially on the end surface of the outer race of bearing 5 facing in the x negative direction, and thereby limit the axial movement of bearing 5 in the x negative direction (extracting direction).

Holder member 6 (bearing 6) swings (about the fulcrum 82 (fulcrum engaging portion 63)) and the axis of holder member 6 moves in the y direction. Accordingly, the x positive side end portion 101 of worm shaft 10 rotates about the x negative side end portion 102 (supported by bearing 50). Therefore, (the rotation axis O of) the worm shaft 10 is movable in the direction (y direction) toward and away from (the rotation axis P of) the worm wheel 11.

The seat (or abutment) portion 65 of holder member 6 is formed on the side (the y negative side) to confront the side through hole 83 of outer holder 8. Seat portion 65 is located at a position approximately coincident with the position of the side through hole 83 as viewed from the y direction.

As shown in FIG. 1, the plunger 70 of biasing mechanism 7 is inserted through the side through hole 83 of outer holder 8. The forward end 700 of plunger 70 abuts fittingly on the recessed seat (abutment) portion 65 of holder member 6. The coil spring of the biasing mechanism 7 has an elastic force Fp and an elastic modulus (or modulus of elasticity) Kp. The elastic modulus Kp is set at such a value that the coil spring is compressed by movement of the plunger 70 in the y negative direction, by an input to the backlash adjusting mechanism from the worm shaft 10 when a steering operation is performed in a state in which the vehicle speed is approximately equal to 0 km/h (stationary steering).

The buffer member 9 is fit in the annular groove 66 of holder member 6, as shown in FIG. 1 and FIG. 11. Buffer member 9 is an elastic member of a rubber or a resin material. In the illustrated example, buffer member 9 is an annular member having a circular cross sectional shape (O ring). The side through hole 83 of outer holder 8 (and the seat portion 65 of holder member 6) is located on the (x positive) side of the buffer member 9 (and annular groove 66) which is the side closer to the fulcrum 82 formed in the bottom portion 81 of outer holder 8 (and the fulcrum engaging portion 63 formed in the bottom portion 61 of holder member 6).

Buffer member 9 is disposed under compression (in the compressed state) radially between holder member 6 and outer holder 8. The inside circumference of buffer member 9 abuts radially inwards on the bottom of annular groove 66, and the outside circumference of buffer member 9 abuts radially outwards on the inside circumferential surface of cylindrical wall portion 80 of outer holder 8. The annular buffer member 9 is compressed radially over the whole circumference of buffer member 9 around the axis of holder member 6 (or the rotation axis O of worm shaft 10). Thus, the buffer member 9 is disposed in the radially compressed state between holder member 6 and outer holder 8 (holder receiving portion 4). Buffer member 9 functions to buffer or cushion collision between outer holder 8 (holder receiving portion 4) and holder member 6 when holder member 6 is moved in outer holder 8 (holder receiving portion 4), by the compressive deformation.

Buffer member 9 has an elastic force Fd and an elastic modulus (or modulus of elasticity) Kd. The elastic forcer Fd of buffer member 9 is so set that the elastic force Fd of buffer member 9 is smaller than the elastic force Fp of the elastic member (coil spring) of biasing mechanism 7, at any position of holder member 6 in the y direction in movement of holder member 6 in the y direction in outer holder 8 (holder receiving portion 4). That is, the elastic force Fd of buffer member 9 is smaller than the elastic force Fp of the elastic member (coil spring) of biasing mechanism 7 irrespective of the amounts of deformation of the buffer member 9 and the elastic member (the coil spring) of biasing mechanism 7. The elastic modulus Kd is so set as to satisfy a following mathematical expression.

$$Kd < \{Kp + (Fp0 - Fd0)/La\}$$

In this expression, La is a gear wear amount (an amount of gear wear). The gear wear amount La is equal to a difference (L0−L1) resulting from subtraction, from an axis-to-axis distance L0 between the rotation axis P of worm wheel 11 and the rotation axis O of worm wheel 10 in the state in which the elastic force Fd of buffer member 9 is Fd0, and the elastic force Fp of the elastic member (coil spring) of biasing mechanism 7 is Fp0, of an axis-to-axis distance L1 between the rotation axis P of worm wheel 11 and the rotation axis O of worm wheel 10 in the state in which the worm wheel 11 (or worm shaft 10) is worn off and the tooth top (addendum) of the teeth of worm shaft 10 touches the bottom of the teeth of worm wheel 11.

[Operation]

The backlash adjusting mechanism is designed to hold the backlash (or play) between worm wheel 11 and worm shaft 10 (worm 100) of the speed reducer 1 approximately at zero in an inoperative state of the power steering apparatus. The backlash adjusting mechanism has an operation range to absorb dimensional errors of constituent parts and changes in dimensions due to temperature changes, and has a function to follow the wear of the resin worm wheel 10 and decrease of tooth thickness due to creep etc. Specifically, the holder member 6 supporting, through the bearing 5, one end (101) of worm shaft 10 is arranged to be able to move in a direction to move the rotation axis O of worm shaft 10 toward and away from the rotation axis P of worm wheel 11 (the y direction). In the illustrated example, holder member 6 is swingable about fulcrum 82 disposed at a position shifted in the z direction. With this swing motion, the holder member 6 can move in the above-mentioned direction (the y direction). (However, it is optional to employ an arrangement to enable the holder member 6 to move in the y direction with a different setup other than the swing motion about the fulcrum.) Furthermore, the biasing mechanism 7 is arranged to urge the bearing 5 (holder member 6) in the y positive direction, and thereby pushes the worm shaft 10 (worm 100) toward the worm wheel 11. Thus, the backlash adjusting mechanism minimizes the axis-to-axis distance (L), in the y direction, between the rotation axis P of worm wheel 11 and the rotation axis O of worm shaft 10, and thereby reduces the backlash approximately to zero, in the inoperative state of the power steering apparatus. It is optional to employ an arrangement in which the plunger 70 of biasing mechanism 7 abut directly on the bearing 5, instead of abutting on the holder member 6.

When a torque of the speed reducer 1 is produced at the time of operation of the power steering apparatus, there is produced, in the engaging portion of the teeth of worm shaft 10 (worm 100) and the teeth of worm wheel 11, a reaction force urging the worm shaft 10 in the y negative direction (the direction to increase the axis-to-axis distance L). The actual axis-to-axis distance L (that is, the backlash) is determined by the balance between the reaction force (in the direction increasing the axis-to-axis distance L) inputted from worm shaft 10 to the backlash adjusting mechanism, and the biasing force (in the direction decreasing the axis-to-axis distance L) of biasing mechanism 7. (The above-mentioned reaction force becomes greater as the torque produced by the electric motor increases.) Thus, the backlash adjusting mechanism has an aligning function adjusting the axis-to-axis distance L (the function to adjusting the backlash), and the range of the operation, that is the range (alignment range) within which the axis-to-axis distance L can be adjusted, is the range in which holder member 6 can be moved in outer holder 8 (holder receiving portion 4), so that this alignment range is determined by the size of the clearance CL.

In the illustrated example of this embodiment, the apparatus is used in the state in which worm shaft 10 is moved backward in the y negative direction from the closest position where the axis-to-axis distance L is smallest, when a predetermined torque is produced by speed reducer 1. Specifically, the elastic modulus Kp of the elastic member in the form of the coil spring in this example, determining the urging force of the biasing mechanism 7 is set equal to a value such that the elastic member (the coil spring) is compressed (from the initial state) by the input from worm shaft 10 to the backlash adjusting mechanism 7 when a steering operation is performed in a rest state in which the vehicle speed is approximately equal to 0 km/h (at the time of so-called stationary steering or rest steering). With the elastic modulus Kp of the coil spring set in this way at a level resulting in compressive deformation at the time of stationary steering, the power steering system can restrain deterioration or astringency of the steering feeling caused by the elastic modulus Kp set too high. In the case of setting to hold the backlash approximately at zero even at high torque, an initial set load of the coil spring become high, and the friction of the worm gear becomes greater, so that the steering feeling may be deteriorated. By contrast to this setting, the backlash adjusting mechanism of the illustrated example can avoid the above-mentioned problem with the setting of the elastic modulus Kp of the coil spring of the biasing mechanism 7, to allow a predetermined amount of backlash at the time of high torque of predetermined magnitude (at the time of the stationary steering). The above-mentioned rest state is a state in which the vehicle speed is lower than or equal to a predetermined low speed equivalent to the stoppage of the vehicle. The rest state does not necessarily means the state in which the vehicle speed is exactly equal to zero km/h.

Holder member 6 is movable radially in holder receiving portion 4 together with bearing 5. Therefore, holder member 6 could produce noises by colliding against the holder receiving portion 4 (outer holder 8). Buffer member 9 can restrain noises due to the collision. Buffer member 9 is provided at least on both sides in the y direction which is the direction of major movement of holder member 6 (at positions where the possibility of the collision is high). Specifically, the buffer member 9 is provided at least on the y positive side of holder member 6 (the side closer to worm wheel 11), and the y negative side of holder 6 (the side remoter from worm wheel 11) within the circumference of holder member 6. In the illustrated example, buffer member 9 is in the form of an O ring, and the O ring buffer member 9 can function for cushioning mainly with the portions on both sides in the y direction. It is possible to employ various forms of the buffer member 9 other than the O ring. In any case, the buffer member 9 may be a means for cushioning collision of holder member 6 on both sides in the y direction. In the case of O ring, the buffer member 9 can provide the buffering effect in the whole circumstance of holder member 6, and cushion the collision of holder member 6 against outer holder 8 in all radial directions. The O ring buffer member 9 can prevent collision noises reliably even when the swing motion of holder member 6 about the fulcrum 82 is deviated more or less from the y direction.

Figure 12:
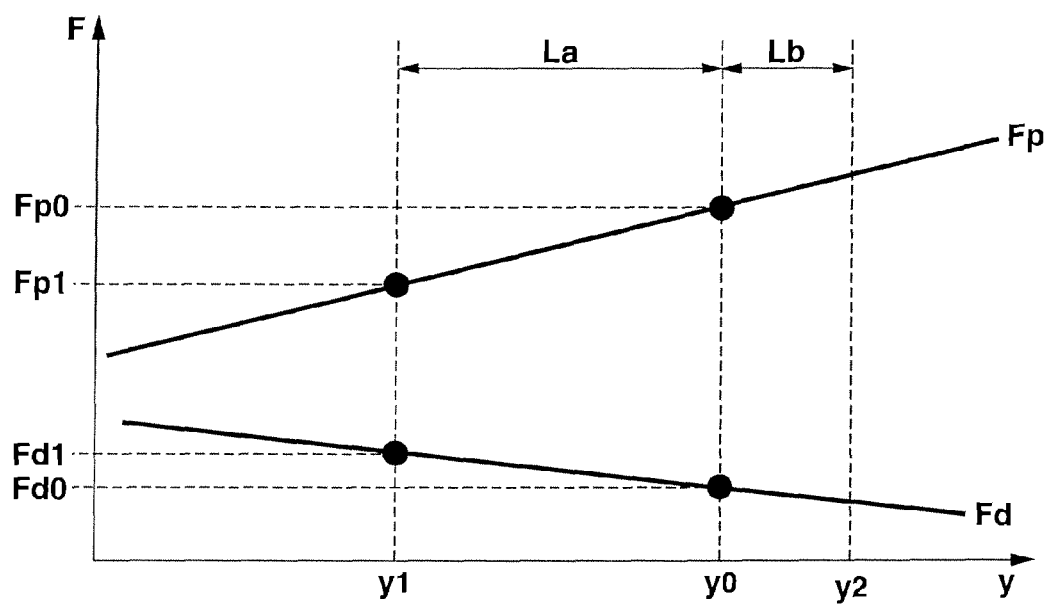
FIG. 12 is a graphic characteristic view showing a relationship between a y position of a worm shaft 10 shown in FIG. 1 in a y direction, and an elastic force Fd of a buffer member 9 and an elastic force Fp of a coil spring of a biasing mechanism 7.

FIG. 12 shows a relationship between the y position of worm shaft 10 in the y direction, and the elastic force Fp of the coil spring of biasing mechanism 7, and the elastic force Fd of buffer member 9 on the y positive side (at the portion to abut against the inside circumferential surface of outer holder 8 on the opposite side opposite to biasing mechanism 7 with respect to the rotation axis O of worm shaft 10). The direction indicated by an arrow in the horizontal axis (the rightward direction in FIG. 12) is the y negative direction. A y position y0 is an initial position in the y direction of worm wheel 11 when there is no wear in the worm gear (worm wheel 10 and other parts) and the power steering apparatus is inoperative. A y position y2 is a (remotest) position where the worm shaft 10 is moved backward (away from worm wheel 11) farthest, to the side opposite to worm wheel 11 (the y negative side) because of wear of the worm gear (the tooth top of the teeth of worm shaft 10 comes in contact with the bottom of the teeth of worm wheel 11). A distance Lb is a difference between the initial position y0 and the remotest position y2. A y position y1 is a (closest) position where the worm shaft 10 is moved forward toward worm wheel 11 most (to the y positive side). A distance La is a difference between the initial position y0 and the closest position y2. Distance La represents an amount of wear of the gear from the initial position.

As shown in FIG. 12, as the y position of worm shaft 10 is shifted to the y negative side (the remoter side), the coil spring of biasing mechanism 7 is compressed to a greater amount of compressive deformation, and the elastic force Fp of the coil spring is increased. On the other hand, as the y position of worm shaft 10 is shifted to the y negative side (the remoter side), the amount of compressive deformation of the buffer member 9 (on the y positive side) is decreased, and hence the elastic force Fd of buffer member 9 (on the y positive side) is decreased.

The elastic force Fd of buffer member 9 (on the y positive side) is set smaller than the elastic force Fp of the elastic member (the coil spring) of the biasing mechanism 7 in a normal operation range (y0~y2) inclusive of a condition during operation of the power steering apparatus. With this setting of the elastic force Fd of the buffer member 9 smaller than the urging force (the elastic force Fp) of the biasing mechanism 7, it is possible to decrease influence of the elastic force Fd of buffer member 9, on the urging force (Fp) of the biasing mechanism 7. Accordingly, the biasing mechanism 7 can produce the urging or biasing force effectively for reducing the backlash, and it is possible to restrain the tuning of the urging force of biasing mechanism 7 from being changed by buffer member 9.

Moreover, in this example, the elastic modulus Kd of buffer member 9 (the slope or gradient of Fd with respect to y in FIG. 12) is so set that the elastic force Fp is greater than the elastic force Fd even in the state in which the elastic force Fp of the elastic member (coil spring) of basing mechanism 7 becomes smallest with respect to elastic force Fd of buffer member 9 (at the position y1 where the difference between Fp and Fd becomes smallest) because of the wear of the worm gear. By adjusting the elastic modulus Kd of buffer member 9 instead of the elastic modulus Kp of the coil spring of biasing mechanism 7, it is possible to improve the flexibility or freedom of setting the urging force of biasing mechanism 7.

In this example, the elastic modulus Kd of buffer member 9 is set to satisfy a following relationship.

$$Kd < \{Kp + (Fp0 - Fd0)/La\}$$

By rearranging this expression, a following expression is obtained.

$$\{Kd \times La + Fd0\} < \{Kp \times La + Fp0\}$$

The left side of this expression represents a value of the elastic force Fd in the state of gear wear (Fd1 shown in FIG. 12) obtained by adding, to a value Fd0 of the elastic force Fd of buffer member 9 at the initial position y0 of worm shaft 10, an increase (Kd×La) of the elastic force Fd corresponding to the distance La of the gear wear quantity. The right side of this expression represents a value of the elastic force Fp in the state of gear wear (Fp1 shown in FIG. 12) obtained by subtracting, from a value Fp0 of the elastic force Fp of the elastic member (the coil spring) of biasing mechanism 7 at the initial position y0 of worm shaft 10, a decrease (Kp×La) of the elastic force Fp corresponding to the distance La of the gear wear quantity. In the above expression, it is possible to use values of Fp and Fd at an any position y in place of Fp0 and Fd0 at the initial position y0. With the setting of elastic modulus Kd to make the elastic force Fd of buffer member 9 smaller than the urging force of biasing mechanism 8 (elastic force Fp) even in the state in which the worm gear is worn to a greatest extent, the backlash adjusting mechanism can decrease the influence of elastic force Fd of buffer member 9 on the urging force of biasing mechanism 7, and thereby provides the above-mentioned effects. Specifically, the hardness or the stiffness of buffer member 9 is set smaller than a predetermined value to make the elastic force Fd1 of buffer member 9 smaller than the elastic force Fp1 in the greatest wear state of the worm gear (the position y1).

The backlash adjusting mechanism includes the outer holder 8 having therein the holder receiving portion 4, and the buffer member 9 is provided between holder member 6 and outer holder 8. With the outer holder 8 prepared separately, there is no need for forming a structure for receiving the holder member 6 and buffer member 8, in the gear housing 3. Therefore, it is possible to simplify the structure of the gear housing 3 formed from a large casing, and thereby improve the manufacturability.

The annular groove 66 receiving buffer member 9 is formed in holder member 6, on a side (on the x negative side) opposite to the fulcrum engaging portion 63 in the axial direction of holder member 6 (the x direction). Therefore, both sides of holder member 6 in the axial direction (the x direction) are held or supported in the outer holder 8, by the fulcrum engaging portion 63 and buffer member 9, respectively. This structure can restrain rattle or unsteadiness in the axial direction, of holder member 6 in outer holder 8.

The through hole 80 of outer holder 8 is formed, in the axial direction of outer holder 8 (the x direction), on the x positive side of the buffer member 9 which is the side closer to the fulcrum 82. Therefore, in the assembly operation of inserting the holder member 6 with the buffer member 9 in the annular groove 66, into the outer holder 8, from the bottom portion 61 of holder member 6 (from the side of holder member 6, opposite to the fulcrum 82 (the x negative sider)), it is possible to avoid passage of buffer member 9 through the position of through hole 80 and thereby avoid damage of buffer member 9 due to contact with through hole 80.

Holder member 6 includes the retaining portion 68 for retaining bearing 5. Therefore, holder member 6 can prevent the bearing 5 from being removed from holder member 6. The retaining portion 68 includes the retaining portion 68b formed in the axially extending region 600 on the z negative side located between the first and second cutouts 69a and 69b, of the cylindrical wall portion 60 of holder member 6. The axially extending portion 600 is connected with the radially extending region 610 of bottom portion 61 of holder member 6 formed between the first and second cutouts 69a and 69b. Moreover, the radially extending region 610 can bend slightly to the x positive side about the boundary 611 (shown in FIG. 9). Therefore, the axially extending region 600 of cylindrical wall portion 60 can be bent elastically in the radial outward direction (to the z negative side), and the x negative side end of the axially extending region 600 formed with the retaining portion 68b can be moved slightly in the radial outward direction (to the z negative side) so that the (diametrical) distance between the first and second retaining portions 68a and 68b confronting diametrically each other in the z direction at the x negative side end of cylindrical wall portion 60. This construction makes it easier to insert the bearing 5 into holder member 6. It is optional to form the cutouts 69a and 69b only in the cylindrical wall portion 60 without forming the cutouts in the bottom portion 61. In the illustrated example, the cutouts 69a and 69b are extended from wall portion 60 into bottom portion 61 and the radially extending region 610 is formed, in bottom portion 61, between cutouts 69a and 69b. With the radially extending region 610 formed, between cutouts 69a and 69b, in bottom portion 61 which is smaller in wall thickness than cylindrical wall portion 60, the axially extending region 600 of wall portion 60 can be bent more easily in the radial outward direction (the z negative direction). Especially in the illustrated example, the region 610 is made thinner than the remaining portion of bottom portion 61, and the boundary 611 is extended in the form of a straight line, so that the region 610 is readily bent around the boundary 611 as the fulcrum.

In the wall portion 60, the rigidity is decreased by formation of cutouts 69. Therefore, the buffering characteristic of buffer member 9 disposed in annular groove 66 of wall portion 60 might be changed in the region formed with cutouts 69. In the illustrated example, however, the cutouts 69 are formed in the region away from the region(s) (on the y positive side and y negative side of holder member 6) where the possibility is high, of contact of holder member 6 against the outer holder 8 (holder receiving portion 4) during swing motion of holder member 6 about the fulcrum 82, and the buffer member 9 is to perform the buffering or cushioning function mainly. Therefore, this arrangement can reduce the above-mentioned change in the buffering characteristic of buffer member 9. In this example, the cutouts 69 are opened in the wall portion 60 in the region separated circumferentially from the position of biasing mechanism 7 (through hole 83) on the y negative side, and separated circumferentially from the position opposite to the biasing mechanism 7 (the position diametrically opposite to the position of through hole 83) on the y positive side. Specifically, (the openings of) cutouts 69 are formed on the side (the z negative side) opposite to the fulcrum 82 with respect to the through hole 83 in the circumference of wall portion 60. However, it is optional to employ an arrangement in which cutouts 69 are formed on the z positive side or the side containing the fulcrum 82 with respect to the through hole 83 in the circumferential direction of cylindrical wall portion 60.

[Effects] The power steering apparatus, the speed reducer 1 and the backlash adjusting mechanism according to the embodiment can provide following effects.

(1) A power steering apparatus adapted to be mounted in a vehicle, comprises: a steering mechanism; an electric motor; a worm gear arrangement or worm drive (10, 11) forming a speed reducer or reduction gear (1); a gear housing (3); a holder receiving portion (4); a bearing (5); a holder member (6); a biasing or urging mechanism (7); and a buffer or cushion member (9).

The steering mechanism includes a steering shaft (2) connected with a steering wheel, and the steering mechanism is arranged to transmit a steering operation from the steering wheel to a steerable wheel of the vehicle.

The electric motor is arranged to impart a steering force to the steering mechanism.

The speed reducer (reduction gear) (1) is provided between the steering mechanism and the electric motor, and formed by the worm gear arrangement which includes a worm shaft (10) extending from a first shaft end (portion) (102) (on the x negative side) arranged to receive rotation from the electric motor, to a second shaft end (portion) (101) (on the x positive side), and a worm wheel (11) provided on the steering shaft (2) and engaged with the worm shaft (10).

The gear housing (3) includes a wheel receiving portion (31) receiving the worm wheel (11) and a shaft receiving portion (30) receiving the worm shaft (10).

The holder receiving portion (4) is formed in the shaft receiving portion (30) on a side near the second shaft end (101) (on the x positive side) of the worm shaft (10).

The bearing (5) supports the second shaft end (portion) (101) of the worm shaft (10) rotatably (on the x positive side).

The holder member (6) includes a bearing receiving portion (67) receiving the bearing (5). The holder member (6) is so arranged that the holder member (6) can move, together with the bearing (5) supporting the worm shaft (2), in the holder receiving portion (4), in a direction (the y positive direction) moving a rotation axis (O) of the worm shaft (2) toward a rotation axis (P) of the worm wheel (11).

The biasing mechanism (7) is provided in the gear housing, and includes an elastic member (such as a coil spring) to develop an elastic force (Fp) to urge the worm shaft (10) (through the holder member (6)) in a direction to move the rotation axis (O) of the worm shaft (10) toward the rotation axis (P) of the worm wheel (11) (the y positive direction).

The buffer member (9) is arranged to be compressed between the holder receiving portion (4) and the holder member (6) when the holder member (6) is moved in the holder receiving portion (4), to buffer collision between the holder receiving portion (4) and the holder member (6). The buffer member (9) is made of a material such as rubber or resin material and provided at least on a closer side (the y positive side) and a remoter side (the y negative side) in the circumference of the holder member (6). The closer side is the side (the y positive side) of (the axis of) the holder member (6) which is closer to the worm wheel (11). The remoter side is the side (the y negative side) of (the axis of) the holder member (6) which is remoter from the worm wheel (11) and which is opposite to the closer side.

An elastic force (Fd) of the buffer member (9) is smaller than the elastic force (Fp) of the elastic member (the coil spring) of the biasing mechanism (7). With this setting making the elastic force (Fd) of the buffer member (9) smaller than the elastic force (Fp) of the elastic member (the coil spring) of the biasing mechanism (7), it is possible to reduce influence exerted on the urging force of the biasing mechanism 7 by the elastic force (Fd) of the buffer member (9).

(2) In the above-mentioned power steering apparatus, the elastic member (coil spring) of the biasing mechanism (7) is made of an elastic material and disposed in a compressed state compressed from a state of a natural length, to produce the elastic force; and an elastic modulus Kd of the buffer member (9) is so set to satisfy a following relationship, $$Kd<Kp+(Fp0-Fd0)/La$$

where Kd is the elastic modulus of the buffer member (9), Kp is an elastic modulus of the elastic member of the biasing mechanism (7), the elastic force of the elastic member of the biasing mechanism is represented by Fp, the elastic force of the buffer member (9) is represented by Fd, and La is a gear wear quantity represented by a difference resulting from subtraction, from an axis-to-axis distance (L0) between the rotation axis (P) of the worm wheel (11) and the rotation axis (O) of the worm shaft in a reference state in which the elastic force of the buffer member is equal to Fd0 and the elastic force of the elastic member of the biasing mechanism is equal to Fp0, of an axis-to-axis distance (L1) between the rotation axis (P) of the worm wheel (11) and the rotation axis (O) of the worm shaft (10) in a worn state in which a tooth top of teeth of the worm shaft touches a tooth bottom of teeth of the worm wheel due to wear-off of at least one of the worm wheel and the worm shaft. Thus, it is possible to reduce the influence on the urging force of the biasing mechanism (7) by the elastic force of the buffer member (9).

Although the invention has been described above with reference to certain embodiments of the invention, the invention is not limited to the embodiments described above. Various modifications and variations are possible within the purview of the present invention. For example, the power steering apparatus may be provided in, or connected with, a rack shaft to be connected with steerable wheel(s) instead of the arrangement of the illustrated embodiment in which the power steering apparatus is to be connected with the steering shaft 2 of the steering mechanism or steering linkage. Moreover, the steering mechanism may be of the rack and pinion type as in the illustrated embodiment, or may of any other type.

According to one of possible interpretations of the illustrated embodiment, an apparatus which may be a power steering apparatus or a speed reducer or speed reducing mechanism for a power steering apparatus for a vehicle, includes a basic structure which comprises: a worm gear arrangement including a worm shaft extending axially from a first shaft end (on the x negative side) to a second shaft end (on the x positive side), and a worm wheel engaged with the worm shaft; a bearing to support (the second shaft end of) the worm shaft rotatably at the second shaft end (on the x positive side); a gear housing structure enclosing the worm gear arrangement (and the bearing), and defining a holder receiving portion; a holder member arranged to hold the bearing, and fit movably (radially) in the holder receiving portion to move (the second shaft end 101 of) the worm shaft through the bearing to adjust a backlash between the worm shaft and the worm wheel; a biasing mechanism to urge the holder member or the bearing in a nearing direction (corresponding to the y positive direction) to reduce the backlash with a biasing elastic force; and a buffer member which is arranged to be compressed by the holder member when the holder member is moved in the nearing direction or a receding direction (corresponding to the y negative direction) (to increase the backlash) opposite to the nearing direction, to buffer collision of the holder member against an inside wall surface defining the holder receiving portion.

The apparatus (a power steering apparatus or a speed reducer or speed reducing mechanism) including the above-mentioned basic structure may further include any one of more of following features (F1)~(F17).

(F1) The buffer member is set to have an elastic force smaller than the biasing elastic force. (F2) The buffer member is set to have an elastic modulus Kd (the gradient of Fd with respect to y in FIG. 12) satisfying a following relationship, $$Kd < \{Kp + (Fp0 - Fd0)/La\}$$

(F3) The buffer member is an O ring. In the form of the O ring, the buffer member can perform the buffering or cushioning function fully around the holder member. (F4) The gear housing structure includes a gear housing enclosing the worm gear arrangement (and the bearing), and an outer holder which is installed in the gear housing and which is formed with the holder receiving portion; and the buffer member (such as the O ring) is disposed between the holder member and the outer holder. With this feature employing the outer holder separately prepared, the apparatus can simplify the structure of the gear housing which may be a large casting, for example. (F5) The outer holder includes a cylindrical or tubular (wall) portion and a bottom portion which closes one end of the cylindrical portion and which is formed with a fulcrum. The holder member includes a fulcrum engaging portion engaging with the fulcrum of the outer holder and enabling the holder member to swing in the outer holder about the fulcrum. The holder member further includes a buffer receiving portion receiving the buffer member at an axial portion spaced axially from the position of the fulcrum engaging portion. The buffer receiving portion may be an annular groove adapted to receive the buffer member in the form of an O ring. The fulcrum engaging portion and the buffer member such as the O ring are arranged to hold the holder member at two axially spaced positions in the holder receiving portion stably.

(F6) The holder member includes a cylindrical wall portion surrounded by the cylindrical wall portion of the outer holder and a bottom portion confronting the bottom portion of the outer holder inside the outer holder. The fulcrum engaging portion is formed in the bottom portion of the holder member at a position away from a center of the bottom portion (or away from an axis of the holder member). (F7) The biasing mechanism includes a plunger abutting against the holder member (or the bearing 5), and an elastic member (such as a coil spring) to urge the plunger to the holder member or the bearing. (F8) The gear housing structure or the outer holder includes a (side) through hole through which the biasing mechanism or the plunger is inserted, and the (side) through hole is located axially between the buffer member (such as the O ring) (on the x negative side) and the fulcrum (on the x positive side). This arrangement is advantageous for protecting the buffer member from being injured by interference between the buffer member and the through hole.

(F9) The holder member includes a retaining portion to prevent the bearing from being extracted axially from the holder member. (F10) The holder member (6) is made of a resin material, and includes a cylindrical wall portion (60) surrounding the bearing and including two axially extending cutouts dividing the cylindrical wall portion (60) into a major arc portion, and a minor arc portion (600) which is formed between the axially extending cutouts (69a, 69b), which has a cross sectional shape extending circumferentially to form a (minor) circular arc (which subtends an angle smaller than 90 degrees at the center of the circle in the illustrated example), and which is formed with a retaining portion (68b) for preventing axial extraction of the bearing from the holder member.

(F11) The minor arc portion (600) of the cylinder wall portion (60) of the holder member (6) is formed at a position diametrically opposite to the position of a fulcrum (82, 63) about which the holder member is swingable. (F12) The two cutouts and the fulcrum engaging portion are arranged symmetrically in a manner of lateral symmetry. (F13) The two cutout portions (69a, 69b) are extended in a bottom portion (61) of the holder member (6). (F14) The holder member (6) includes a bottom portion (61) formed with a fulcrum engaging portion (63) about which the holder member is swingable. (F15) The holder member (6) includes a (first) portion (such as the fulcrum engaging portion 63) for defining a swing axis about which the holder member is swingable, and the swing axis extends along the center axis of the (cylindrical) holder member (6), at a position lying on an imaginary bisecting plane (or median plane) containing the center axis of the (cylindrical) holder member (6). The holder member (6) includes a (second) portion (such as the abutment portion 65) for receiving, from the biasing mechanism (7), the urging force in a radial direction extending along an imaginary straight line (along the y axis) perpendicular to the imaginary bisecting plane. (F16) The buffer member is disposed around the bearing (5) (as shown in FIG. 1 and FIG. 11) (so that, in the axial direction of the holder, the buffer member is located substantially at the axial position of the bearing (5). (F17)) The holder member is cylindrical and includes: a first portion (such as the fulcrum engaging portion 63) for determining a swing axis about which the holder member is swingable {the swing axis (determined by the engagement between the fulcrum engaging portion 63 and fulcrum 82) extending along the center axis of the (cylindrical) holder member (6), at a position lying on an imaginary bisecting plane (or median plane parallel to the x-z plane) containing the center axis of the (cylindrical) holder member (6)}; a second portion (such as the abutment portion 65) for receiving, from the biasing mechanism (7), an urging force in a radial direction {extending along an imaginary straight line (along the y axis) perpendicular to the imaginary bisecting plane}; and a third portion (600) which is formed circumferentially between two axially extending cutouts (69*a*, 69*b*), and which is located at a position diametrically opposite to the position of the first portion (63) for determining the swing axis, the second portion (65) for receiving the urging force being located circumferentially between the position of the first portion and the position of the third portion.

This application is based on a prior Japanese Patent Application No. 2012-209127 filed on Sep. 24, 2012. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An apparatus for power steering of a vehicle, comprising:
   a worm gear arrangement including a worm shaft extending axially from a first shaft end to a second shaft end, and a worm wheel engaged with the worm shaft;
   a bearing to support the worm shaft rotatably at the second shaft end;
   a gear housing structure enclosing the worm gear arrangement, and defining a holder receiving portion;
   a holder member arranged to hold the bearing, and fit movably radially in the holder receiving portion to move the worm shaft through the bearing to adjust a backlash between the worm shaft and the worm wheel;
   a biasing mechanism to urge at least one of the holder member and the bearing in a nearing direction to reduce the backlash with a biasing elastic force; and
   a buffer member which is arranged to be compressed by the holder member when the holder member is moved in the nearing direction and a receding direction opposite to the nearing direction, to buffer collision of the holder member against an inside wall surface defining the holder receiving portion, the buffer member being set to have an elastic force smaller than the biasing elastic force,
   wherein the gear housing structure includes a gear housing enclosing the worm gear arrangement, and an outer holder defining the holder receiving portion, and wherein the outer holder includes a cylindrical wall portion and a bottom portion which closes one end of the cylindrical portion and which is formed with a fulcrum; and the holder member includes a fulcrum engaging portion engaging with the fulcrum of the outer holder and enabling the holder member to swing in the outer holder about the fulcrum.

2. The apparatus for power steering, as claimed in claim 1, wherein the holder member further includes a buffer receiving portion receiving the buffer member, and a side portion which is arranged to receive an urging force radially from the biasing mechanism and which is located axially between the fulcrum engaging portion and the buffer receiving portion.

3. The apparatus for power steering, as claimed in claim 2, wherein the holder member includes a cylindrical wall portion surrounded by the cylindrical wall portion of the outer holder and a bottom portion which confronts the bottom portion of the outer holder inside the outer holder and which is formed with the fulcrum engaging portion.

4. The apparatus for power steering, as claimed in claim 2, wherein the biasing mechanism includes a plunger abutting against the holder member, and an elastic member including a coil spring to urge the plunger to the holder member; and
   wherein the outer holder includes a side through hole through which the plunger of the biasing mechanism is inserted, and the side through hole is located axially between the buffer member and the fulcrum.

5. An apparatus for power steering of a vehicle, comprising:
   a worm gear arrangement including a worm shaft extending axially from a first shaft end to a second shaft end, and a worm wheel engaged with the worm shaft;
   a bearing to support the worm shaft rotatably at the second shaft end;
   a gear housing structure enclosing the worm gear arrangement, and defining a holder receiving portion;
   a holder member arranged to hold the bearing, and fit movably radially in the holder receiving portion to move the worm shaft through the bearing to adjust a backlash between the worm shaft and the worm wheel;
   a biasing mechanism to urge at least one of the holder member and the bearing in a nearing direction to reduce the backlash with a biasing elastic force; and
   a buffer member which is arranged to be compressed by the holder member when the holder member is moved in the nearing direction and a receding direction opposite to the nearing direction, to buffer collision of the holder member against an inside wall surface defining the holder receiving portion, the buffer member being set to have an elastic force smaller than the biasing elastic force,
   wherein the holder member includes a cylindrical wall portion surrounding the bearing and extending axially from a first end to a second end and a bottom portion closing the second end of the cylindrical wall portion and including a portion determining a swing axis about which the holder member swings in the holder receiving portion, and the holder member further includes a retaining portion to prevent the bearing from being extracted axially from the holder member, the retaining portion projecting radially inwards from the first end of the cylindrical wall portion of the holder member.

6. An apparatus for power steering of a vehicle, comprising:
   a worm gear arrangement including a worm shaft extending axially from a first shaft end to a second shaft end, and a worm wheel engaged with the worm shaft;
   a bearing to support the worm shaft rotatably at the second shaft end;
   a gear housing structure enclosing the worm gear arrangement, and defining a holder receiving portion;
   a holder member arranged to hold the bearing, and fit movably radially in the holder receiving portion to move the worm shaft through the bearing to adjust a backlash between the worm shaft and the worm wheel;

a biasing mechanism to urge at least one of the holder member and the bearing in a nearing direction to reduce the backlash with a biasing elastic force; and a buffer member which is arranged to be compressed by the holder member when the holder member is moved in the nearing direction and a receding direction opposite to the nearing direction, to buffer collision of the holder member against an inside wall surface defining the holder receiving portion, the buffer member being set to have an elastic force smaller than the biasing elastic force, wherein the holder member is made of a resin material, and includes a cylindrical wall portion surrounding the bearing and including two axially extending cutouts dividing the cylindrical wall portion into a major arc portion, and a minor arc portion which is formed circumferentially between the axially extending cutouts, which has a cross sectional shape extending circumferentially to form a circular arc, and which is formed with a retaining portion for preventing axial extraction of the bearing from the holder member, wherein the minor arc portion of the cylinder wall portion of the holder member is formed at a position diametrically opposite to the position of a fulcrum about which the holder member is swingable.

7. An apparatus for power steering of a vehicle, comprising:

a worm gear arrangement including a worm shaft extending axially from a first shaft end to a second shaft end, and a worm wheel engaged with the worm shaft;

a bearing to support the worm shaft rotatably at the second shaft end;

a gear housing structure enclosing the worm gear arrangement, and defining a holder receiving portion;

a holder member arranged to hold the bearing, and fit movably radially in the holder receiving portion to move the worm shaft through the bearing to adjust a backlash between the worm shaft and the worm wheel;

a biasing mechanism to urge at least one of the holder member and the bearing in a nearing direction to reduce the backlash with a biasing elastic force; and a buffer member which is arranged to be compressed by the holder member when the holder member is moved in the nearing direction and a receding direction opposite to the nearing direction, to buffer collision of the holder member against an inside wall surface defining the holder receiving portion, the buffer member being set to have an elastic force smaller than the biasing elastic force, wherein the holder member is cylindrical and includes:

a first portion for determining a swing axis about which the holder member is swingable;

a second portion for receiving, from the biasing mechanism, a urging force in a radial direction; and a third portion which is formed circumferentially between two axially extending cutouts, and which is located at a position diametrically opposite to a position of the first portion for determining the swing axis, the second portion for receiving the urging force being located circumferentially between the position of the first portion and the position of the third portion.

* * * * *